United States Patent [19]
Nozawa et al.

[11] Patent Number: 5,235,641
[45] Date of Patent: Aug. 10, 1993

[54] FILE ENCRYPTION METHOD AND FILE CRYPTOGRAPHIC SYSTEM

[75] Inventors: Masafumi Nozawa, Odawara; Akinobu Shimada, Hiratsuka; Toshifumi Nishimura, Minamiashigara; Katsuharu Kakuse, Hadano; Tokuhiro Tsukiyama, Kanagawa; Kiyoshi Yata; Yasuhiro Ishii, both of Hadano; Kazuo Takaragi, Ebina; Yasushi Kuba; Fujio Fujita, both of Yokohama, all of Japan

[73] Assignee: Hitachi, Ltd., Tokyo, Japan

[21] Appl. No.: 668,098

[22] Filed: Mar. 12, 1991

[30] Foreign Application Priority Data

Mar. 13, 1990 [JP] Japan .................... 2-61917

[51] Int. Cl.$^5$ ............................................ H04L 9/02
[52] U.S. Cl. .......................................... 380/21; 380/3; 380/49
[58] Field of Search .................... 380/3, 4, 21, 22, 43, 380/49, 50

[56] References Cited

U.S. PATENT DOCUMENTS

| | | | |
|---|---|---|---|
| 4,078,152 | 3/1978 | Tuckerman, III | 380/49 X |
| 4,203,166 | 5/1980 | Ehrsam et al. | 380/49 X |
| 4,238,853 | 12/1980 | Ehrsam et al. | 380/49 X |
| 4,262,329 | 4/1981 | Bright et al. | 380/49 |
| 4,352,952 | 10/1982 | Boone et al. | 380/49 X |
| 4,608,456 | 8/1986 | Paik et al. | 380/49 |
| 5,081,675 | 1/1992 | Kittirutsunetorn | 380/4 |

*Primary Examiner*—Tod Swann
*Attorney, Agent, or Firm*—Antonelli, Terry, Stout & Kraus

[57] ABSTRACT

In an information processing system having an upper rank apparatus and an external storage device which performs transmission and reception of data between the storage device and the upper rank apparatus, at least one of encryption and decryption of the data by use of an algorithm controlled by a desired data key is performed in the external storage device, while generation, encryption and decryption of the data key are performed on the upper rank apparatus side. By this configuration, the burden of the upper rank apparatus is largely reduced and the secrecy of data stored in the external storage device can be surely kept without spoiling the throughput of the whole system.

15 Claims, 3 Drawing Sheets

FILE ENCRYPTION METHOD AND FILE CRYPTOGRAPHIC SYSTEM

BACKGROUND OF THE INVENTION

1. Field of the Invention

The present invention relates to a file cryptographic technique and particularly relates to a technique suitable for maintaining secrecy of, for example, data files in an external storage device of a computer system, or the like.

2. Description of the Related Art

Recently, as computer systems have been made large in scale and arranged in a network, opportunities for a number of persons to access one system increase. Accordingly, a cry for increases security in the management of data files has risen to cause an important technical problem in this field.

In such a background, also with respect to an external storage device of a computer system which conducts recording and reproducing of a large quantity of data, there have been proposed secrecy keeping techniques which involve encrypting of the data files.

For example, Japanese Patent Laid-Open JP-A-54-87032 discloses a technique in which encryption and decryption of data are performed by a cryptographic device connected to an upper rank system (host) by way of a channel.

Specifically, in the disclosed technique, ordinary data transmitted to the cryptographic device of the upper rank system is encrypted into completely meaningless data based on a predetermined algorithm using a key and the encrypted data is transmitted to an external storage device so as to be written in a recording medium. In a data reading-out operation, a procedure reverse to that described above is taken so that the decryption of the data is performed at the upper rank system side.

An algorithm for controlling data encryption and decryption by using a key, for example, is disclosed in Japanese Patent Laid-Open JP-A-52-130505.

By delivery and reception of the key, it is possible that a medium carrying encrypted data formed in one system and recorded therein is transported into another system so that the encrypted data is read out and decrypted in the other system.

In the prior system described above, however, when data is written into the external storage device, a procedure is followed in which the data is first transmitted to the cryptographic device connected to the channel so as to be encrypted therein, and after encryption, the encrypted data is read out again from the cryptographic device, and then the encrypted data is written into the external storage device. Accordingly, there arises a problem that the channel and the cryptographic device connected to the channel become a bottleneck for data input/output processing so that the throughput, that is, data transmission capability per unit time, between the channel and various external storage devices connected to the channel is lowered.

Further, in the case where data is encrypted in accordance with an algorithm controlled by using a key as disclosed in the latter conventional technique, any person or any system who or which can learn the contents of the key can read the data by decrypting the data. That is to say, the secrecy of data encrypted in accordance with an algorithm using a key solely depends on the management of the key. Accordingly, in order to ensure a high-degree of secrecy of a data encryption file system using a key, it is an indispensable condition to strictly manage the key, for example, by converting the key into a more complicated cryptograph.

SUMMARY OF THE INVENTION

It is therefore an object of the present invention to provide a file encryption method in an information processing system, in which a high level of security of data delivered and received between an upper rank (host) apparatus and an external storage device can be realized without degrading the throughput of the system.

It is another object of the present invention to provide a file cryptographic system in an information processing system, in which a high degree of security of data delivered and received between an upper rank apparatus and an external storage device can be realized without degrading the throughput of the information processing system.

It is a further object of the present invention to provide a file cryptographic system, in which the secure performance of the whole system is improved by ensuring a high level of security of a key for controlling a data encryption algorithm.

It is a still further object of the present invention to provide a file cryptographic system, in which efficient use of an external storage device through data compression and security of data secrecy through encryption are compatible with each other.

It is another object of the present invention to provide a file cryptographic system, in which management of a data key and data encrypted by this data key can be performed safely and easily.

The above and other objects and novel features of the present invention will become apparent from the description of this specification and accompanying drawings.

In order to attain the above objects, according to an aspect of the present invention, the file encryption method in an information processing system a having a hierarchically arranged upper rank apparatus and an external storage device which performs delivery and reception of data between the storage device and the upper rank apparatus, is featured in that at least one of encryption and decryption of the data in accordance with an algorithm controlled by a desired data key is performed in the external storage device, and generation, encryption and decryption of the data key are performed in the upper rank apparatus side.

According to another aspect of the present invention, the file cryptographic system comprises an upper rank apparatus, a cryptographic device connected to the upper rank apparatus, and an external storage device provided with at least one of functions of encryption and decryption of data delivered and received between the storage device and the upper rank apparatus.

According to the file encryption method of the present invention as described above, the upper rank apparatus does not take part in troublesome processing, such as ordinary data encryption and decryption, so that the burden of the upper rank apparatus due to data encryption and decryption can be largely reduced and the secrecy of data stored in the external storage device can be securely maintained without degrading the throughput of the whole system.

According to the file cryptographic system of the present invention, the encryption and decryption of data delivered and received between the external storage device and the upper rank apparatus are performed, for example, by encryption and decryption functions provided in the external storage device in accordance with an algorithm controlled by a desired raw data key, while the encryption and decryption of the raw data key to be used by the external storage device are performed by the cryptographic device connected to the upper rank apparatus. Accordingly, it becomes unnecessary for the upper rank apparatus to take part n troublesome processing such as ordinary data encryption and decryption, so that the burden of the upper rank apparatus due to data encryption and decryption can be largely reduced and the secrecy of data stored in the external storage device can be securely maintained without degrading the throughput of the whole system.

Further, the raw data key which is used for data encryption and decryption and which has an influence on the performance of data secrecy operations is converted into a high-degree and complicated cryptograph so that the raw data key can be kept safely and surely. Accordingly, the secrecy keeping performance of the whole system can be maintained at a high-degree.

Generally, the redundancy of data is lost by encryption. In the case of the present invention, however, data transmitted into the external storage device from the upper rank apparatus is subjected to a data compression processing in the external storage device prior to the encryption of the data, so that reduction of a large quantity of data can be realized by the effective data compression, in the same manner as an ordinary case where data encryption is not performed, whereby the efficient use of the external storage device through data compression and secure maintenance of data secrecy through encryption can be made compatible with each other.

Further, by complicatedly encrypting the data key in the cryptographic device on the upper rank apparatus side, the data key and ordinary data encrypted by the data key in the external storage device can be safely stored together in one and the same recording medium so that the management of the data key and data encrypted by the data key can be performed safely and easily.

DETAILED DESCRIPTION OF THE EMBODIMENTS

Referring to the accompanying drawings, an example of the file encryption method and the file cryptographic system which are embodiments of the present invention will be described in detail hereunder.

Figure 1:
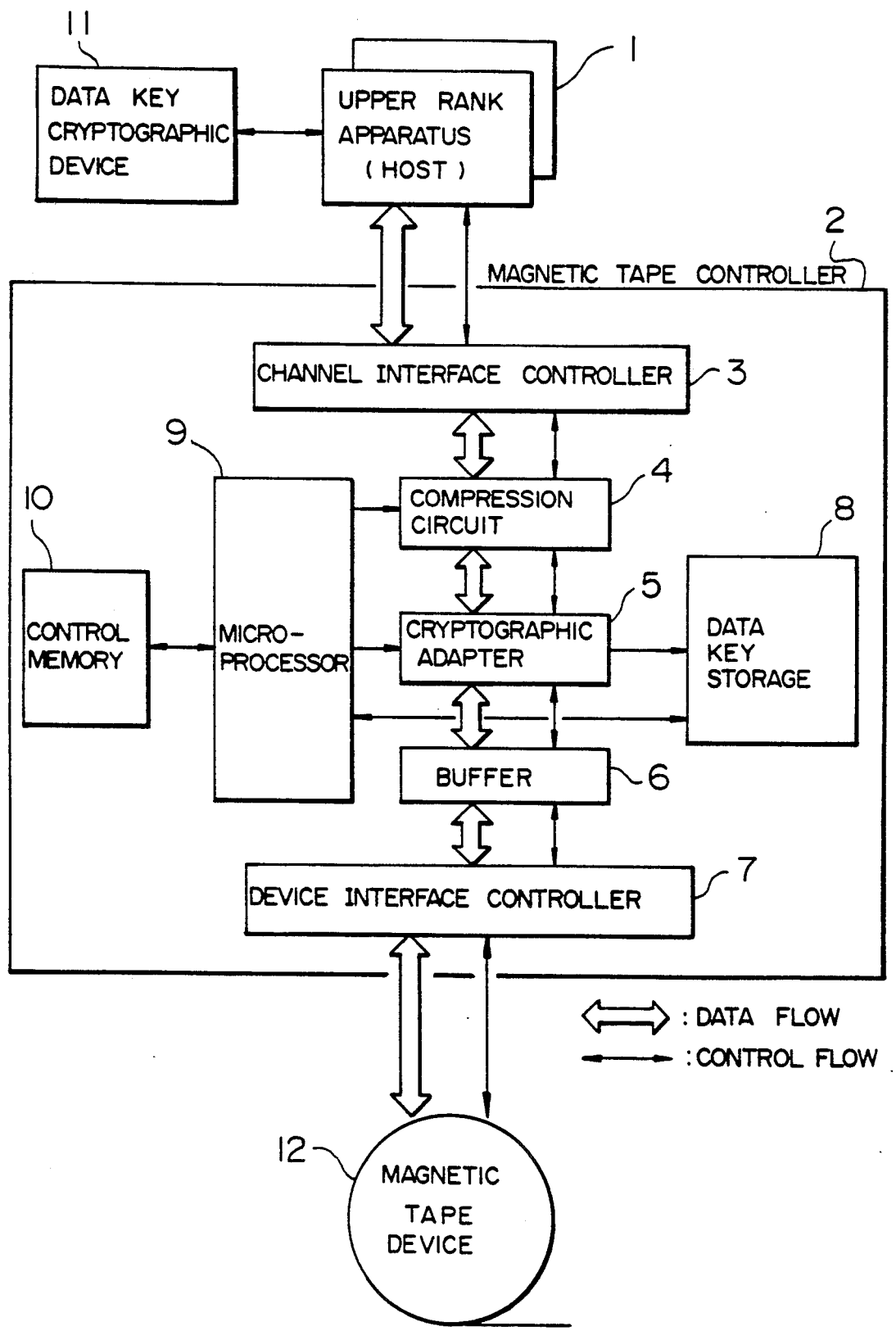
FIG. 1 is a block diagram showing an example of the file cryptographic system as an embodiment of the present invention.
Figure 2:
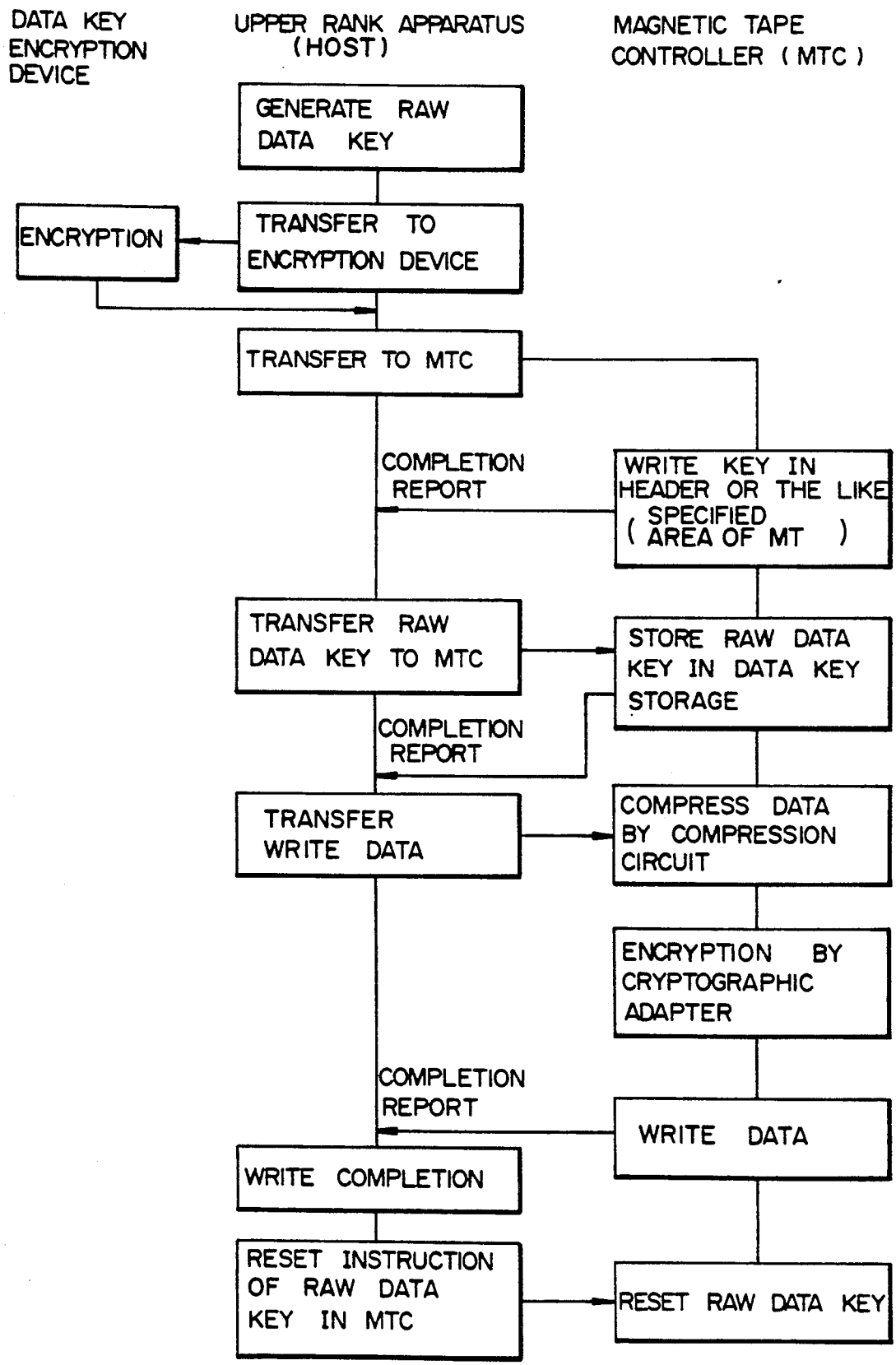
FIG. 2 is an explanatory block diagram showing an example of the operation of the file encryption method and the cryptographic system according to another embodiment of the present invention.
Figure 3:
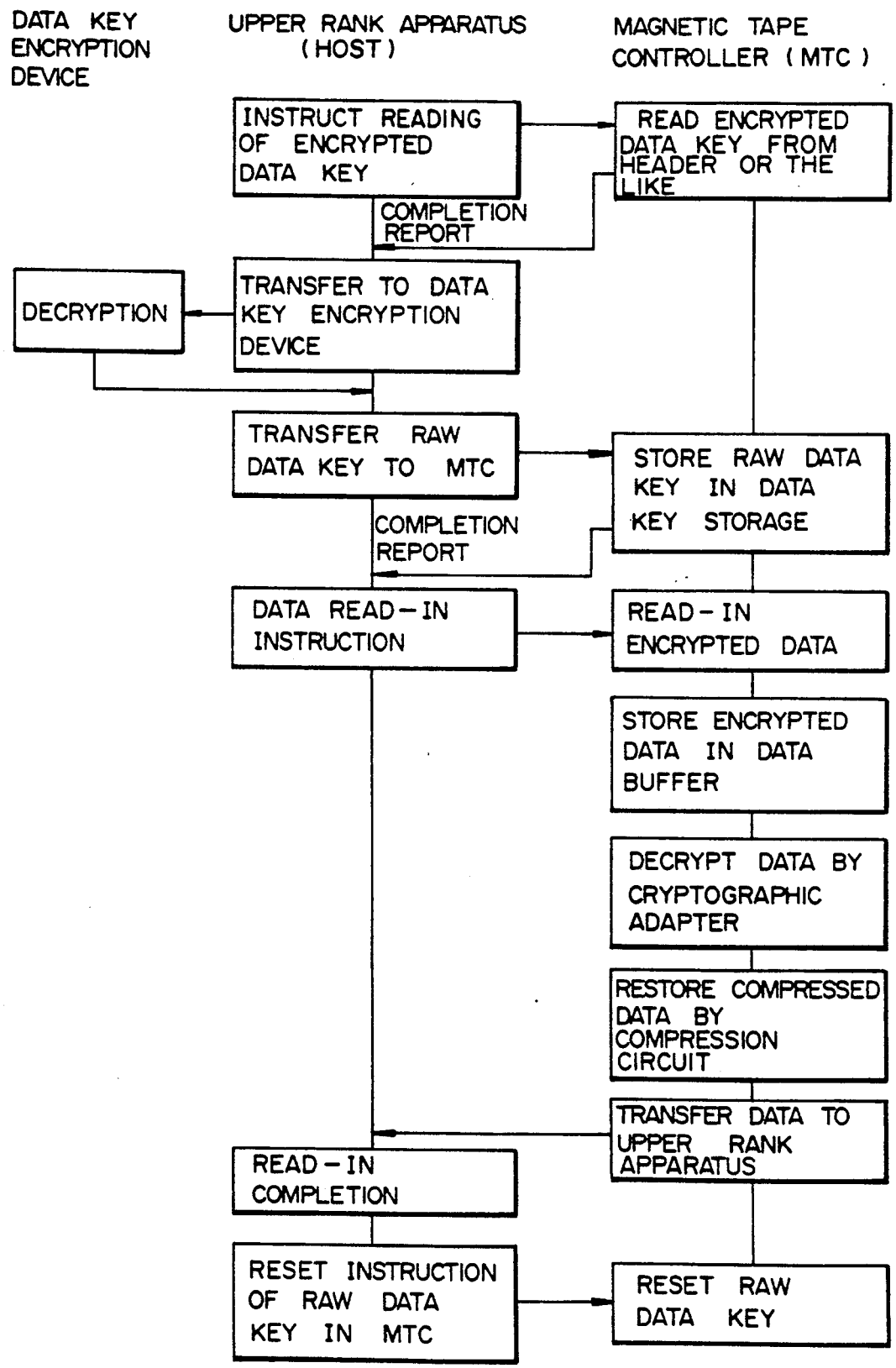
FIG. 3 is an explanatory block diagram showing an example of the operation of the file encryption method and the cryptographic system as a further embodiment of the present invention.

FIG. 1 is a block diagram showing an example of the configuration of the file cryptographic system according to the embodiment, and FIGS. 2 and 3 are explanatory diagrams showing examples of the operation of the file encryption method and the file cryptographic system as the embodiments of the invention.

First, referring to FIG. 1, the configuration of the file cryptographic system of the embodiment will be described.

In the following, as an example of an external storage device constituting the file cryptographic system, the description will refer to a magnetic tape subsystem.

For example, in an information processing system, such as a computer system, a hierarchically arranged upper rank apparatus (host) 1 is constituted by a central processing unit, etc. The upper rank apparatus 1 is connected by way of a channel (not shown for performing control on a data input/output operation from/to the outside in place of the upper rank apparatus, and a magnetic tape device 12 is connected to this channel through a magnetic tape control device 2.

The magnetic tape control device 2 operates to control delivery and reception of information between the upper rank apparatus 1 and the magnetic tape device 12, and the magnetic tape device 12 operates information recording/reproducing on/from a medium, such as a magnetic tape.

A data key cryptographic device 11 which operates in a manner as described later is connected to the upper rank apparatus 1 through the channel.

The magnetic tape control device 2 includes a microprocessor 9 which operates to perform overall control in accordance with a program stored in a control memory 10, a channel interface control section 3 which operates as a slave of the upper rank apparatus 1 to control the delivery/reception of information to/from the upper rank apparatus 1, and a device interface control section 7 which operates to control the delivery/reception of information to/from the magnetic tape device 12.

Further, between the channel interface control section 3 and the device interface control section 7, there are provided in order a compression circuit 4 which performs processing, such as compression/expansion of data delivered and received between the upper rank apparatus 1 and the magnetic tape device 12, and a buffer 6 which stores the data temporarily.

This buffer 6 is constituted, for example, by a semiconductor memory, etc. and interposed between the upper rank apparatus 1 which operates at a high speed and the magnetic tape device 12 which operates at a relatively low speed so that the buffer 6 constitutes a well known storage hierarchy so as to temporarily store the data delivered and received between the upper rank apparatus 1 and the magnetic tape device 12 to thereby absorb a large difference in speed between the upper rank apparatus 1 and the magnetic tape device 12 to improve the efficiency in data transmission between the two, In this case, a cryptographic adapter 5 and a data key storage mechanism 8 accessed by this cryptographic adapter 5 are provided between the compression circuit 4 on the channel interface control section 3 side and the buffer 6 on the device interface control section 7 side.

This cryptographic adapter 5 is arranged to perform encryption and decryption of the data delivered and received between the upper rank apparatus 1 and the magnetic tape device 12 in accordance with a desired algorithm controlled by a raw data key which is set in the data key storage mechanism 8 in a manner as described later.

That is, in the case of this embodiment, the data transmitted from the upper rank apparatus 1 so as to be stored in the magnetic tape device 12 is first compressed in the compression circuit 4 then encrypted in the cryptographic adapter 5, and then written in the magnetic tape device 12 through the buffer 6 and the device interface control section 7.

When the encrypted data stored in the magnetic tape device 12 is to be read out, on the other hand the target encrypted data is read out from the magnetic tape device 12 into the buffer 6 through the device interface control section 7, decrypted in the cryptographic adapter 5, expanded in the compression circuit 4 and then transmitted to the upper rank apparatus 1 through the channel interface control section 3.

Now, referring to FIGS. 2 and 3, the operation of the file cryptographic system of this embodiment will be described hereunder.

First, an example of the operation of writing data transmitted from the upper rank apparatus 1 into the magnetic tape device 12 will be explained.

The upper rank apparatus 1 generates a raw data key necessary for the magnetic tape control device 2 to perform encryption/decryption of data delivered and received between the upper rank apparatus 1 and the lower rank magnetic tape device 12. The upper rank apparatus 1 gives the generated raw data key to the data key cryptographic device 11 and instructs the latter to perform data encryption thereon.

It is a matter of course that the generation of the raw data key is not limited to the upper rank apparatus 1, but the raw data key may be generated in the data key cryptographic device 11 in accordance with the instruction given from the upper rank apparatus 1.

Upon reception of the instruction, the data key cryptographic device 11 performs complicated and high-degree encryption of the raw data key to thereby generate an encrypted data key.

Next, the upper rank apparatus 1 reads out the encrypted data key from the data key cryptographic device 11 through the channel or the like and gives an instruction to the magnetic tape device 12 through the magnetic tape control device 2 so as to cause the magnetic tape device 12 to write the encrypted data key into a header portion or the like at the beginning of an ordinary data recording area in the magnetic tape medium mounted in the magnetic tape device 12.

Further, the upper rank apparatus 1 sends out the raw data key to the magnetic tape control device 2 and, at the same time, gives an instruction to the microprocessor 9 of the magnetic tape control device 2 so that the microprocessor 9 sets the raw data key in the data key storage mechanism 8.

Not limited specifically, in the data key cryptographic device 11, when a raw data key to be set in the magnetic tape control device 2 is generated and sent out, the raw data key may be encrypted to an extent that the cryptograph can be decrypted in the cryptographic adapter 5 of the magnetic tape control device 2 so that the raw data key is set in the data key storage mechanism 8 after being completely decrypted in the magnetic tape control device 2.

After the magnetic tape control device 2 has set the received raw data key in the data key storage mechanism 8, the upper rank apparatus 1 sends out write data to the channel interface control section 3 of the magnetic tape control device 2 through the channel.

For example, in the case where data compression is performed, data received by the channel interface control section 3 is transferred to the compression circuit 4 according to the instruction from the microprocessor 9 so that the data is subjected to compression processing in accordance with a desired algorithm.

Thereafter, the compressed data is transferred to the cryptographic adapter 5 in accordance with an instruction from the microprocessor 9 so that the data is encrypted in accordance with a desired algorithm controlled by the raw data key which has been set in the data key storage mechanism 8 as described above.

Thus, the data successively subjected to compression processing and encryption are successively written into the magnetic tape medium mounted in the magnetic tape device 12 through the buffer 6 and the device channel interface control section 7.

After completion of predetermined write processing, the upper rank apparatus 1 gives an instruction to the magnetic tape control device 2 to reset the raw data key, and the microprocessor 9 of the magnetic tape control device 2 performs processing for erasing the raw data key set in the data key storage mechanism 8.

FIG. 2 shows an example of series of operations of the upper rank apparatus 1, the data key cryptographic device 11, and the magnetic tape control device 2 in data write processing under the condition that the operations are correlated with each other.

On the other hand, an example of the operation of reading the data encrypted and stored in the magnetic tape medium of the magnetic tape device 12 by the upper rank apparatus 1 is as follows.

First, the upper rank apparatus 1 gives an instruction to the magnetic tape control device 2 to read the header portion of the magnetic tape medium mounted in the magnetic tape device 12, in which the encrypted data key has been stored as described above.

In response to this instruction, the microprocessor 9 of the magnetic tape control device 2 reads, from the magnetic tape medium, the encrypted data key which has been written in the magnetic tape medium of the magnetic tape device 12 in a previous recording operation or the like.

Next, the upper rank apparatus 1 transfers the encrypted data key read in the magnetic tape control device 2 to the data key cryptographic device 11 through the channel and gives an instruction to the data key cryptographic device 11 to cause the latter to decrypt the encrypted data key to produce a raw data key.

In response to this instruction, the data key cryptographic device 11 decrypts the encrypted data key to thereby produce a raw data key.

The thus produced raw data key is transferred again to the magnetic tape control device 2 through the channel in accordance with an instruction of the upper rank apparatus 1 and the magnetic tape control device 2 sets this raw data key in the data key storage mechanism 8.

Not limited specifically, in the data key cryptographic device 11, when the encrypted data key is decrypted into a raw data key to be set in the magnetic tape control device 2, the encrypted data key may be decrypted to an extent that the resultant cryptograph can be decrypted in the cryptographic adapter 5 of the magnetic tape control device 2 so that the raw data key is set in the data key storage mechanism 8 after being completely decrypted into the raw data key in the magnetic tape control device 2.

Next, the upper rank apparatus 1 gives an instruction to the magnetic tape control device 2 to read-in the encrypted data which has been recorded on the magnetic tape medium mounted in the magnetic tape device 12.

In response to this instruction, the microprocessor 9 of the magnetic tape control device 2 gives a data read-out instruction to the device interface control section 7.

The data read out from the magnetic tape device 12 is first stored in the buffer 6, and then the cryptographic adapter 5 reads out the encrypted data from the buffer 6 and decrypts the encrypted data in accordance with an algorithm controlled by the raw data key which has been set in the data key storage mechanism 8.

Thereafter, if the thus decrypted data is data which has been subjected to compression processing, for example, in the recording operation, the microprocessor 9 makes the decrypted data pass through the compression circuit 4 so that the decrypted data is subjected to expansion processing so that the compressed data are restored to not-compressed data.

The restored data is sent to the upper rank apparatus 1 side through the channel interface control section 3 in accordance with an instruction from the upper rank apparatus 1.

Upon completion of the series of data read-in processing operations from the magnetic tape medium of the magnetic tape device 12 by the upper rank apparatus 1, the magnetic tape control device 2 resets or erases the raw data key which has been set in the data key storage mechanism 8 of the magnetic tape control device 2, in accordance with an instruction from the upper rank apparatus 1.

FIG. 3 shows an example of a series of operations of the upper rank apparatus 1, the data key cryptographic device 11, and the magnetic tape control device 2 in the processing of data read-in from the magnetic tape device 12 in the condition that the operations are correlated with each other.

As described above, according to the file encryption method and the file cryptographic system in this embodiment, the encryption of data to be recorded/reproduced onto/from a magnetic tape medium of the magnetic tape device 12 is performed by the cryptographic adapter 5 and the data key storage mechanism 8, which are provided in the magnetic tape control device 2, in accordance with a desired algorithm controlled by a raw data key set in the data key storage mechanism 8. Accordingly, it is not necessary to cause the upper rank apparatus 1 to take a part in troublesome processing of ordinary data encryption/decryption, so that an increase of the burden on the upper rank apparatus 1 in connection with data security can be suppressed.

As a result, in the system, a high-degree of secrecy of data can be realized without degrading the property such as throughput and the like in the upper rank apparatus 1.

Further, since the encryption/decryption of a raw data key to be used for control of the encryption/decryption of data in the magnetic tape control device 2 is independently performed in the data key cryptographic device 11 connected to the upper rank apparatus 1, it is possible to strictly manage the raw data key which is important for data security keeping by applying more complicated and high-degree processing to the raw data key than the case of ordinary data without any possibility of reduction of throughput an the like in the upper rank apparatus 1 to thereby realize a file cryptographic system having a high-degree of secrecy.

Further, since data compression processing is performed prior to data encryption in the magnetic tape control device 2 as occasion demands, it is possible to compress the data with a high compression rate the same as that in an ordinary case before the data loses redundancy through encryption, so that efficient use, owing to the data compression, of the magnetic tape medium mounted in the magnetic tape device 12 and the security of a high-degree of data-secrecy can be made compatible.

Further, by the complicated encryption of a raw data key by means of the data key cryptographic device 11, the encrypted raw data key and ordinary data encrypted on the basis of the raw data key can be safely stored in one and the same recording medium.

As a result, for example, in the case where a large quantity of data is to be stored for a long period after being encrypted, in the case where encrypted data is to be used in a plurality of specified information processing facilities through delivery and reception therebetween, and so on, the data key management can be performed safely and easily.

In the foregoing, the invention attained by the inventor of this application has been described with respect to some embodiments thereof. The present invention is not however limited to the foregoing embodiments, but it is a matter of course that the embodiments may be changed or modified without departing from the scope of the invention.

For example, in the foregoing, although the case of a magnetic tape subsystem has been described as an example of the external storage device constituting the file cryptographic system, the external storage device is not limited to this, but may be any other external storage device.

The configuration of the magnetic tape subsystem for performing data encryption/decryption is not limited to that shown in the foregoing embodiments, but may be any other configuration so long as it can realize the same function.

The advantageous effects obtained by the typical features of the present invention are briefly summarized as follows.

That is, according the present invention, the file encryption method in an information processing system having an upper rank apparatus and an external storage device which performs delivery and reception of data between the storage device and the upper rank apparatus has a feature in that at least one of encryption and decryption of the data by use of an algorithm controlled by a desired data key is performed in the external storage device, and generation, encryption and decryption of the data key are performed in the upper rank apparatus side. Accordingly, it is not necessary to cause the upper rank apparatus to take a part in troublesome processing of ordinary data encryption/decryption, so that an increase of the burden on the upper rank apparatus in connection with data security can be greatly reduced and the secrecy of data to be stored in an external storage device can be secured without degrading the throughput of the whole system.

According to the present invention, the file cryptographic system comprises an upper rank apparatus, a cryptographic device connected to the upper rank apparatus, and an external storage device provided with at least one of functions of encryption and decryption of data which are delivered and received between the storage device and the upper rank apparatus. Accordingly, for example, by causing the encryption and decryption functions provided in the external storage device to perform the encryption and decryption of data which is delivered and received between the storage device and the upper rank apparatus and by causing the cryptographic device connected to the upper rank apparatus to perform the encryption and decryption of a raw data key to be used by the external storage device, it becomes unnecessary to cause the upper rank apparatus to take part in troublesome processing such as encryption/decryption and the like of a large quantity of data, so that an increase of the burden on the upper rank apparatus in connection with data can be greatly reduced and the secrecy of data to be stored in the external storage device can be secured without degrading the throughput of the whole system.

Further, by converting the raw data key which is used for data encryption and decryption in the external storage device of data which has an influence on the performance of data security into high-degree and complicated cryptograph by means of the cryptographic device connected to the upper rank apparatus, the raw data key can be stored safely and surely and the secrecy of the whole system can be improved.

Further, by performing data compression processing in the external storage device prior to encryption of data supplied from the upper rank apparatus, that is, before the redundancy of the data is lost through encryption, reduction of a large quantity of data can be realized by the effective data compression in the same manner as in the case where encryption is not performed, so that efficient use, owing to the data compression, of the external storage device and a high level of security of data can be made compatible.

Further, by causing the cryptographic device on the upper rank apparatus side to perform complicated and high-degree encryption of the data key, the encrypted data key and ordinary data encrypted on the basis of the data key in the external storage device can be safely and easily stored in one and the same recording medium. That is, the data key and the data encrypted by the data key can be managed safely and easily.

We claim:

1. A file encryption method for use in an information processing system having a hierarchically arranged upper rank apparatus and an external storage device, which method controls transmission and reception of data between said storage device and said upper rank apparatus, comprising the steps of:
    performing in said external storage device at least one of encryption of data received from said upper rank apparatus for storage in said external storage device and decryption of data stored in said external storage device and requested by said upper rank apparatus, using an algorithm controlled by a data key; and
    performing generation, encryption and decryption of said data key in said upper rank apparatus.

2. A file cryptographic system comprising:
    an upper rank apparatus;
    a cryptographic device connected to said upper rank apparatus; and
    an external storage device, said external storage device including means for performing at least one of encryption of data received from said upper rank apparatus for storage in said external storage device and decryption of data stored in said external storage device and requested by said upper rank apparatus;
    in which said cryptographic device performs encryption and decryption of a raw data key, and said means in said external storage device performs encryption and decryption of data based on said raw data key received from said upper rank apparatus.

3. A file cryptographic system according to claim 2, in which, when decryption of said raw data key is performed in said cryptographic device, incomplete decryption is performed at an extent that the decrypted raw data key is breakable by the function of decryption in said external storage device, so that final decryption of said raw data key is performed in said cryptographic device.

4. A file cryptographic system according to claim 2, in which, when said data transmitted from said upper rank apparatus is encrypted and recorded, the encryption is performed after data compression processing.

5. A file cryptographic system according to claim 2, in which a data key encrypted by the cryptographic device provided at said upper rank apparatus side and ordinary data encrypted by said data key are stored in the same recording medium.

6. A file cryptographic system comprising:
    an upper rank apparatus;
    a cryptographic device connected to said upper rank apparatus; and
    an external storage device, said external storage device including means for performing at least one of encryption of data received from said upper rank apparatus for storage in said external storage device and decryption of data stored in said external storage device and requested by said upper rank apparatus;
    in which, when decryption of said raw data key is performed in said cryptographic device, incomplete decryption is performed to an extent that the decrypted raw data key is breakable by the function of decryption in said external storage device, so that final decryption of said raw data key is performed in said cryptographic device.

7. A file cryptographic system comprising:
    an upper rank apparatus;
    an upper rank apparatus;
    a cryptographic device connected to said upper rank apparatus; and
    an external storage device, said external storage device including means for performing at least one of encryption of data received from said upper rank apparatus for storage in said external storage device and decryption of data stored in said external storage device and requested by said upper rank apparatus;
    in which, when said data transmitted from said upper rank apparatus is encrypted and recorded, the encryption is performed after data compression processing.

8. A file cryptographic system comprising:
    an upper rank apparatus;
    a cryptographic device connected to said upper rank apparatus; and
    an external storage device, said external storage device including means for performing at least one of encryption of data received from said upper rank apparatus for storage in said external storage device and decryption of data stored in said external storage device and requested by said upper rank apparatus;

in which a data key encrypted by the cryptographic device provided at said upper rank apparatus side and ordinary data encrypted by said data key are stored in the same recording medium.

9. A method of effecting secure storage of data in an external storage device by an upper rank apparatus via a storage controller, comprising the steps of:

(a) generating a raw data key and encrypting the raw data key in said upper rank apparatus;

(b) transferring the raw data key and the encrypted raw data key to said storage controller;

(c) storing the raw data key in said storage controller and said encrypted raw data key in a selected storage location in said external storage device;

(d) transferring raw data from said upper rank apparatus to said storage controller;

(e) encrypting said raw data in said storage controller using the raw data key stored therein and storing said encrypted raw data in said selected storage location in said external storage device; and (f) erasing the raw data key stored in said storage controller.

10. The method as defined in claim 9, wherein said step (e) further includes compressing said raw data prior to the encrypting thereof.

11. A method for an upper rank apparatus to access encrypted data stored with an encrypted data key in a storage location of an external storage device via a storage controller, comprising the steps of:

(a) transferring the encrypted data key from said storage location of said external storage device to said upper rank apparatus via said storage controller in response to a request by said upper rank apparatus;

(b) decrypting the encrypted data key to produce a decrypted data key in said upper rank apparatus;

(c) transferring the decrypted data key to said storage controller;

(d) transferring said encrypted data from said storage location to said storage controller and decrypting said encrypted data to produce raw data based on decrypted data key in said storage controller; and (e) transferring said raw data to said upper rank apparatus.

12. A method as defined in claim 11, wherein said encrypted data stored in said storage location is compressed encrypted data, and said step (d) includes decompressing the decrypted data to produce said raw data.

13. A method as defined in claim 11, wherein said step (b) includes partially decrypting said encrypted data key in said upper rank apparatus to produce said decrypted data key, and said step (d) includes further decrypting said decrypted data key in said storage controller to produce a raw data key which is used to decrypt said encrypted data.

14. A method as defined in claim 13, wherein said step (e) is followed by a step of (f) erasing the raw data key in said storage controller.

15. A method as defined in claim 11, wherein said decrypted data key produced in step (b) is a raw data key.

* * * * *